(12) United States Patent
Fan et al.

(10) Patent No.: US 11,716,076 B2
(45) Date of Patent: Aug. 1, 2023

(54) CIRCUITS AND METHODS FOR PERFORMING HASH ALGORITHM

(71) Applicant: SHENZHEN MICROBT ELECTRONICS TECHNOLOGY CO., LTD., Guangdong (CN)

(72) Inventors: Zhijun Fan, Guangdong (CN); Nan Li, Guangdong (CN); Chao Xu, Guangdong (CN); Ke Xue, Guangdong (CN); Zuoxing Yang, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/602,166

(22) PCT Filed: May 13, 2021

(86) PCT No.: PCT/CN2021/093612
§ 371 (c)(1),
(2) Date: Oct. 7, 2021

(87) PCT Pub. No.: WO2021/233198
PCT Pub. Date: Nov. 25, 2021

(65) Prior Publication Data
US 2022/0149827 A1 May 12, 2022

(30) Foreign Application Priority Data

May 20, 2020 (CN) .......................... 202010432370.8

(51) Int. Cl.
*H03K 5/135* (2006.01)
*G06F 9/30* (2018.01)
(Continued)

(52) U.S. Cl.
CPC .......... *H03K 5/135* (2013.01); *G06F 9/30047* (2013.01); *G06F 9/30101* (2013.01); *H03K 3/037* (2013.01); *H04L 9/0643* (2013.01)

(58) Field of Classification Search
CPC .... H03K 5/135; H03K 3/037; G06F 9/30047; G06F 9/30101; G06F 5/06; H04L 9/0643;
(Continued)

(56) References Cited

U.S. PATENT DOCUMENTS

| 5,442,498 A | 8/1995 | Cheung et al. |
| 5,987,620 A * | 11/1999 | Tran ...................... G06F 9/3836 |
| | | 712/E9.063 |

(Continued)

FOREIGN PATENT DOCUMENTS

| CN | 1115474 A | 1/1996 |
| CN | 101171559 A | 4/2008 |

(Continued)

OTHER PUBLICATIONS

Search Query Report from IP.com (performed Apr. 1, 2022). (Year: 2022).*

(Continued)

*Primary Examiner* — Sharon S Lynch
(74) *Attorney, Agent, or Firm* — Venable LLP

(57) ABSTRACT

Circuits and methods for performing a hash algorithm are disclosed. A circuit includes: an input module receiving data; and an operation module calculating a hash value based on the received data. The operation module includes multiple operation stages (0th operation stage, 1st operation stage, up to P-th operation stage, P being a fixed positive integer greater than 1 and less than the number of operation stages in a pipeline structure) arranged in the pipeline structure. Each of the 1st operation stage to P-th operation stage includes: cache registers storing intermediate values of (Continued)

a current operation stage and operating at a first frequency, and extension registers storing extension data of the current operation stage and the extension registers comprising a first set of extension registers operating at the first frequency and a second set of extension registers operating at a second frequency which is 1/N times the first frequency.

13 Claims, 7 Drawing Sheets

(51) Int. Cl.
  *H03K 3/037* (2006.01)
  *H04L 9/06* (2006.01)
(58) Field of Classification Search
  CPC .......... H04L 2209/122; H04L 2209/38; H04L 9/3239
  See application file for complete search history.

(56) References Cited

U.S. PATENT DOCUMENTS

| | | | |
|---|---|---|---|
| 7,827,223 B2* | 11/2010 | Gressel | H04L 9/12 708/250 |
| 8,762,439 B2* | 6/2014 | de Cesare | G06F 7/588 708/250 |
| 10,140,458 B2* | 11/2018 | Kang | G06F 21/602 |
| 10,142,098 B2* | 11/2018 | Suresh | H04L 9/0643 |
| 10,326,596 B2* | 6/2019 | Suresh | G09C 1/00 |
| 10,755,242 B2* | 8/2020 | Suresh | G06F 9/4881 |
| 10,928,847 B2* | 2/2021 | Suresh | G06F 21/64 |
| 10,979,214 B2* | 4/2021 | Denham | H04L 9/0643 |
| 11,251,781 B2* | 2/2022 | Liu | H03K 3/356026 |
| 2004/0075747 A1* | 4/2004 | Silverbrook | G06F 21/79 348/207.99 |
| 2007/0244951 A1* | 10/2007 | Gressel | H04L 9/12 708/252 |
| 2012/0265795 A1* | 10/2012 | de Cesare | G06F 7/588 708/251 |
| 2014/0095891 A1* | 4/2014 | Wolrich | G06F 9/30007 713/190 |
| 2016/0092688 A1 | 3/2016 | Wolrich et al. | |
| 2017/0109162 A1* | 4/2017 | Yap | G06F 9/30156 |
| 2017/0147341 A1* | 5/2017 | Yap | G06F 13/28 |
| 2017/0147342 A1* | 5/2017 | Yap | H04L 9/0643 |
| 2017/0147343 A1* | 5/2017 | Yap | G09C 1/00 |
| 2017/0147348 A1* | 5/2017 | Yap | G06F 13/4068 |
| 2017/0293765 A1* | 10/2017 | Kang | G06F 21/602 |
| 2018/0006808 A1* | 1/2018 | Suresh | H04L 9/0643 |
| 2018/0089642 A1* | 3/2018 | Suresh | H04L 9/0643 |
| 2019/0042249 A1* | 2/2019 | Suresh | G06F 9/30036 |
| 2019/0332378 A1* | 10/2019 | Yap | G06F 21/602 |
| 2020/0036517 A1* | 1/2020 | Denham | H04L 9/3239 |
| 2020/0103930 A1* | 4/2020 | Suresh | G06F 1/06 |
| 2021/0167761 A1* | 6/2021 | Liu | H03K 3/35 |

FOREIGN PATENT DOCUMENTS

| | | |
|---|---|---|
| CN | 102981797 A | 3/2013 |
| CN | 105577363 A | 5/2016 |
| CN | 106575215 A | 4/2017 |
| CN | 108427575 A | 8/2018 |
| CN | 109936441 A | 6/2019 |
| CN | 110430040 A | 11/2019 |
| CN | 110489370 A | 11/2019 |
| CN | 110543481 A | 12/2019 |
| CN | 107835071 A | 2/2020 |
| CN | 108959168 A | 9/2020 |
| CN | 111612622 A | 3/2021 |
| WO | 2006121738 A2 | 11/2006 |
| WO | 2016036491 A1 | 3/2016 |

OTHER PUBLICATIONS

Flip-Flop (Electronics), Wikipedia (recovered Apr. 1, 2022) (Year: 2022).*
Machine Translation of CN108427575A (pub. Aug. 21, 2018) (transl. obtained Apr. 1, 2022) (Year: 2022).*
Search Query Report from IP.com (performed Jul. 22, 2022) (Year: 2022).*
Search Query Report from IP.com (performed Dec. 9, 2022) (Year: 2022).*
Office Action dated Nov. 12, 2020 in Chinese Patent Application No. 202010432370.8.
Zhao Kuan, "Information Technology Album in China Outstanding Master Dissertations", Research on Computing memory architecture to cryptographic algorithm, May 15, 2015, vol. 5.
International Search Report and Written Opinion dated Jul. 30, 2021 in International Application PCT/CN2021/093612.
Notification to Grant Patent Right for Invention dated Feb. 23, 2021 in Chinese Patent Application No. 202010432370.8.

* cited by examiner

CIRCUITS AND METHODS FOR PERFORMING HASH ALGORITHM

CROSS-REFERENCE TO RELATED APPLICATIONS

The present application is a national stage of International Application No. PCT/CN2021/093612, filed on May 13, 2021, which claims priority to Chinese Application No. 202010432370.8 filed May 20, 2020, which is hereby incorporated by reference in their entireties.

TECHNICAL FIELD

The present disclosure relates generally to circuits and methods for performing a hash algorithm, and more particularly, to circuits and methods for implementing data processing (e.g., Bitcoin mining).

BACKGROUND

Bitcoin is a virtual encrypted digital currency in the form of P2P (Peer-to-Peer), the concept of which was originally introduced by Satoshi Nakamoto on Nov. 1, 2008 and formally produced on Jan. 3, 2009. Bitcoin is unique in that it is not issued by a particular monetary institution, but is generated through a large number of operations according to a particular algorithm. Bitcoin transactions use a distributed database composed of numerous nodes in the entire P2P network to confirm and record all transactions and use cryptographic designs to ensure security.

From a cryptographic perspective, Bitcoin is proof of work (POW) based on SHA-256 hash algorithm, and its transaction integrity depends on the collision and pre-image resistance of SHA-256. A hash algorithm is an algorithm that takes variable length data as input and produces a fixed length hash value as output, and is essentially a refinement of the information. Since 1993, the National Institute of Standards and Technology has designed and released several versions of Secure Hash Algorithms (SHA), SHA-256 being one of the secure hash algorithms with a hash length of 256 bits.

SUMMARY

According to a first aspect of the present disclosure, there is provided a circuit for performing a hash algorithm, comprising: an input module for receiving data; and an operation module for calculating a hash value based on the received data, the operation module including a plurality of operation stages arranged in a pipeline structure, the plurality of operation stages including a 0th operation stage, a 1st operation stage, up to a P-th operation stage, P being a fixed positive integer greater than 1 and less than the number of operation stages in the pipeline structure, wherein each of the operation stages from the 1st operation stage to the P-th operation stage includes: a plurality of cache registers for storing intermediate values of a current operation stage and operating at a first frequency, and a plurality of extension registers for storing extension data of the current operation stage and comprising a first set of extension registers operating at a first frequency and a second set of extension registers operating at a second frequency, wherein the second frequency is 1/N times the first frequency, and N is a fixed positive integer which is larger than 1 and not larger than the number of the extension registers in the second set of extension registers.

According to a second aspect of the present disclosure, there is provided an apparatus for performing a data processing algorithm (e.g., a Bitcoin mining algorithm), comprising the circuit for performing a hash algorithm as described above.

According to a third aspect of the present disclosure, there is provided a method for performing an algorithm, the method employing the circuit as hereinbefore described to perform the algorithm.

Other features and advantages of the present disclosure will become apparent through detailed descriptions of the illustrative embodiments of the present disclosure with reference to the following accompanying drawings.

BRIEF DESCRIPTION OF THE DRAWINGS

The drawings, which are incorporated in and constitute a part of this description, illustrate embodiments of the present disclosure and together with the description, serve to explain the principles of the present disclosure.

The present disclosure may be more clearly understood from the following detailed description with reference to the drawings, wherein.

Figure 1:
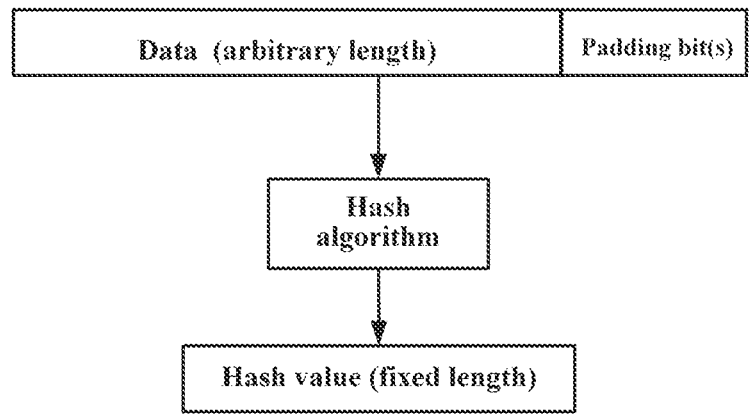
FIG. 1 illustrates an operation process of a hash algorithm.

Note that in the embodiments described below, the same reference sign sometimes is used in common between different drawings to denote the same part or parts having the same function, with omission of repeated description thereof. In the description, similar marks and letters represent similar items, so once a certain item is defined in one figure, no further discussion on it is required in the following figures.

To facilitate understanding, the positions, sizes, ranges, and the like of the respective structures shown in the drawings and the like sometimes do not indicate actual positions, sizes, ranges, and the like. Therefore, the disclosed invention is not limited to the positions, sizes, ranges and the like as disclosed in the drawings and the like. Furthermore, the drawings are not necessarily drawn in proportion, and some features may be exaggerated to show details of particular components.

DETAILED DESCRIPTION

Various illustrative embodiments of the present disclosure will now be described in details with reference to the accompanying drawings. It shall be noted that unless otherwise illustrated, respective arrangements, mathematic expressions and values of the components and steps illustrated in these embodiments do not limit the scope of the present disclosure.

The following descriptions on at least one illustrative embodiment are actually merely illustrative, and by no means serve as any limitation on the present disclosure or its application or utilization. That is, the circuits and methods for implementing a hash algorithm herein are shown by way of examples to illustrate different embodiments of the circuits or methods in this disclosure and are not intended to be limiting. Those skilled in the art, however, will understand that they are merely illustrative, instead of exhaustive, of exemplary ways in which the present disclosure may be practiced.

Techniques, methods and devices that have already been known to ordinary technicians in the art may not be discussed here in detail, but under suitable circumstances, the techniques, methods and devices shall be deemed as parts of the granted description.

The core of using data processing equipment (e.g., mining machines) to perform Bitcoin mining is to obtain rewards based on its computing power to calculate SHA-256. For a mining machine, the size of a chip, the running speed of the chip and the power consumption of the chip are three factors which are crucial to the performance of the mining machine, wherein the size of the chip determines the cost of the chip, the running speed of the chip determines the running speed of the mining machine, namely the computing power, and the power consumption of the chip determines the power consumption degree, namely the mining cost. In practical applications, the most important performance index for measuring the mining machine is the power consumption consumed by a unit computing power, i.e., the power consumption computing power ratio.

To improve security, SHA-256 is performed twice in the Bitcoin protocol. Therefore, it is most important for the Bitcoin mining machine to implement the hash algorithm SHA-256 with a low power consumption computing power ratio.

Accordingly, there is a need for a circuit and method for implementing a hash algorithm with a lower power consumption computing power ratio, and more particularly, there is a need for a circuit and method for implementing Bitcoin mining with a lower power consumption computing power ratio.

As described previously, the hash algorithm takes variable length data as input and produces a fixed length hash value as output. The hash algorithm has the following characteristics: a hash algorithm is used for each data in a large input set comprising a plurality of data, respectively, the respective generated plurality of hash values is evenly distributed and appears random, in general the primary goal of a hash algorithm is to ensure data integrity such that any change in bit or bits in the input data will highly likely change the resulting hash value.

FIG. 1 schematically illustrates an operation process of a hash algorithm. First, input data of an arbitrary length is padded such that the padded data length is an integer multiple of a fixed length (e.g., 512 bits), that is, such that the padded data can be divided into a plurality of data blocks having the fixed length described above. The contents of the padding bits include bit length information of the original data. The hash algorithm then performs operations, such as multiple rounds of operations including data extension and/or compression, etc., on each fixed-length data block, respectively. When all data blocks are used, a final hash value of fixed length is obtained.

For hash algorithms that include multiple rounds of operations (e.g., SHA-256), high speed operation may be achieved using a pipeline structured circuit having multiple operation stages, where each operation stage may use a register to store large amounts of data that vary in real time in operation. The register updates the data stored therein based on a clock signal, the higher the frequency of the clock signal, the higher the flip frequency of the register, and generally the higher the power consumption.

The inventor of the present application believes that the structure and the mode of operation of existing circuits for implementing hash algorithms still remain to be optimized, particularly with regard to the arrangement and mode of operation of a large number of registers in their pipeline structure. In particular, in a pipeline structure, the registers of each operation stage are flipped with a uniform clock signal frequency to ensure that updated data can be stored in the registers. Among these data updates, data shift between the registers of the adjacent operation stages is included, for example, in the first clock cycle, data D stored in a register of the 1st operation stage is shifted to a register of the 2nd operation stage, and in the second clock cycle, the data D in the register of the 2nd operation stage is shifted to a register of the 3rd operation stage. The inventor of the present application has appreciated that if data D does not participate in any operation while in the 2nd operation stage, and does not participate in the operation until shifted into the 3rd operation stage, then the flip of the register of the 2nd operation stage is actually redundant. If it is possible to make the register of the first operation stage not flip in the first clock cycle and still store the data D therein, and then the data D is directly shifted from the 1st operation stage to the 3rd operation stage in the second clock cycle, then on the premise of ensuring that the data D can correctly participate in the operation, the redundant flip of the register of the 2nd operation stage can be eliminated, and the required power consumption can be reduced.

However, such an assumption cannot be realized in existing circuit structures using a unified clock signal control. The inventor of the present application therefore proposes improved circuits and methods for implementing a hash algorithm, thereby achieving the above-described optimization idea.

In order to more clearly and intuitively present the inventive concepts of the present disclosure, SHA-256 will be briefly introduced below and used as a representative example of a hash algorithm to describe a circuit and method for implementing a hash algorithm according to embodiments of the present disclosure. Those skilled in the art will appreciate that the circuit and method for implementing a hash algorithm according to embodiments of the present disclosure is applicable to any hash algorithm and may even further be applied to any circuit and method that may employ a pipeline structure and that has data shifts, and are not limited solely to implementing SHA-256.

Figure 2:
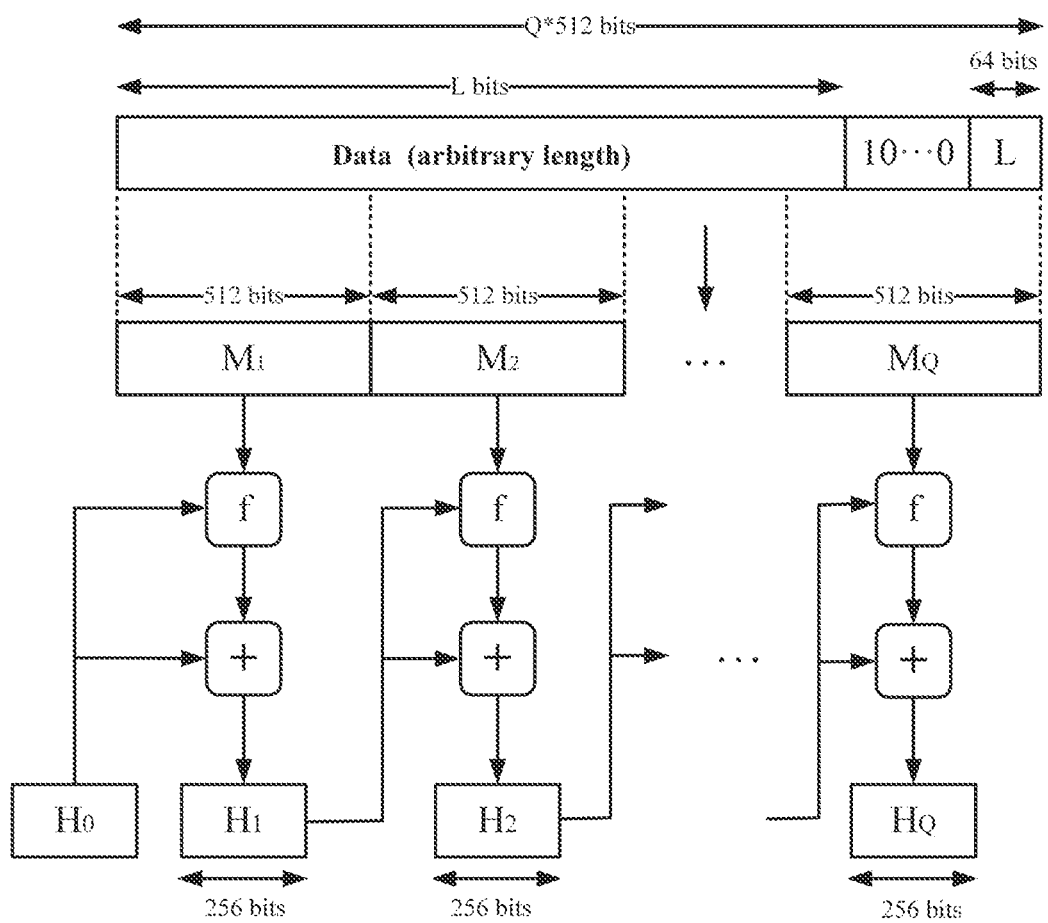
FIG. 2 illustrates an overall process of SHA-256 performing data processing and outputting a data digest.

The input to SHA-256 is data with a maximum length of less than $2^{64}$ bits, and the output is a 256-bit digest of the data, i.e., a hash value. Input data is processed in units of 512-bit data blocks. FIG. 2 illustrates an overall process of SHA-256 performing data processing and outputting a data digest; This process includes steps 1 to 5 as described in detail later.

Step 1: append padding bits. Data with original length of L bits is padded, so that length of data modulo 512 is congruent with 448, that is, length=448 (mod 512). Even if the original data already meets the above length requirement, padding is still required, so the number of padding bits is between 1 and 512. The padding consists of one 1 and subsequent 0(s).

Step 2: append a length. A 64-bit unsigned integer is appended after the padded data, and the 64-bit unsigned integer indicates the length L of the data before padding.

The result of the foregoing steps 1 and 2 is that extension data with a length of an integer multiple of 512 bits is generated, and the length of the extension data can be expressed as Q*512 bits, where Q is a positive integer greater than 1. As shown in FIG. 2, the extension data is divided into Q data blocks $M_1$, $M_2$ up to $M_Q$ each having a length of 512 bits.

Step 3: initialize a hash cache. The initial value H0, intermediate values $H_1$, $H_2$ through $H_{Q-1}$, and the final result $H_Q$ of the hash algorithm are stored in sequence in a 256-bit hash cache, which may include 8 32-bit registers A, B, C, D, E, F, G and H. At the start of the operation, the hash cache is first initialized to the initial value H0, i.e., registers A, B, C, D, E, F, G and H are respectively initialized to integers (hexadecimal) as shown in the following table.

| | |
|---|---|
| A = 0X7A09E667 | E = 0X510E527F |
| B = 0XBB67AE85 | F = 0X9B05688C |
| C = 0X3C6EF372 | G = 0X1F83D9AB |
| D = 0XA54FF53A | H = 0X5BE0CD19 |

Step 4: process data in units of data blocks of 512 bits. The core of SHA-256 is to perform round operations including 64 rounds of operations for each of the 512-bit data blocks $M_1$, $M_2$ through $M_Q$ in turn. The round operations are marked as f in FIG. 2.

Figure 3:
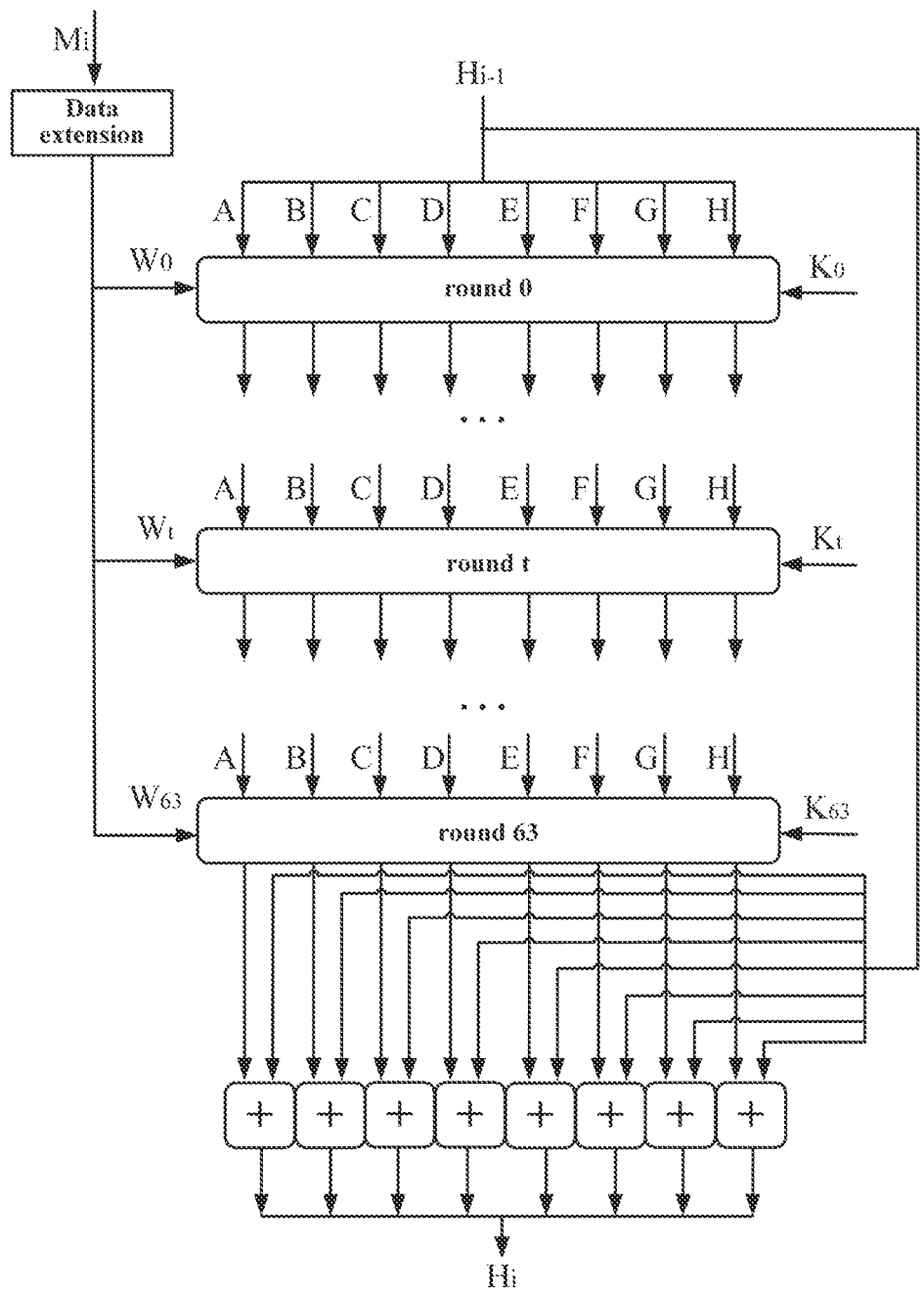
FIG. 3 illustrates an operation process of round operation of SHA-256.

FIG. 3 illustrates an operation process of round operation of SHA-256. In each of the 64 rounds of the round operation, the data in the registers A to H of the hash cache are taken as input and the data in the registers A to H of the hash cache are updated. In round 0 of the round operations on the data block $M_i$, the value in the hash cache is an intermediate value $H_{i-1}$, where i is a positive integer and i≤Q. In each round of the round operations on the data blocks $M_i$, such as round t (t is an integer and satisfies 0≤t≤63), a 32-bit value $W_t$ is used, which is derived from the current 512-bit data block $M_i$, and the derivation algorithm is the data expansion algorithm discussed below. Each round will also use an additional constant Kt to make the operation different for each round. The output of round 63 and the input $H_{i-1}$ of round 0 are added to produce $H_i$, where the 32-bit data in each of registers A to H in the hash cache and the corresponding 32-bit data in $H_{i-1}$ are subjected to an addition operation of modulo $2^{32}$.

Step 5: output. After all Q 512-bit data blocks have been processed, the output from the Q-th stage is a 256-bit data digest HQ, i.e., a hash value.

The internal logic of each of the 64 rounds of operation of the round operations of SHA-256 is discussed in detail below. The operation of the t-th round is defined by the following expression (t is an integer and satisfies 0≤t≤63):

$$T_1 = H + \sum_1 (E) + CH(E, F, G) + K_t + W_t \quad \text{(Expression 1)}$$

$$T_2 = \sum_0 (A) + (A, B, C)$$

$H = G$ $G = F$ $F = E$;

$E = D + T_1$ $D = C$ $C = B$ $B = A$ $A = T_1 + T_2$

Wherein:

$Ch(x, y, z) = (x \text{ AND } y) \oplus ((\text{NOT } x) \text{ AND } z)$ $Maj(x, y, z) = (x \text{ AND } y) \oplus (x \text{ AND } z) \oplus (y \text{ AND } z)$ $$\sum_0 (x) = ROTR^2(x) \oplus ROTR^{13}(x) \oplus ROTR^{22}(x)$$

$$\sum_1 (x) = ROTR^6(x) \oplus ROTR^{11}(x) \oplus ROTR^{25}(x)$$

Wherein, $ROTR^n(x)$ represents circularly right shifting the 32-bit variable x by n bits; $W_t$ denotes a 32-bit word derived from the current 256-bit input data block; $K_t$ denotes a 32-bit additional constant; + denotes modulo $2^{32}$ addition; AND denotes a 32-bit bitwise AND operation; NOT denotes an inversion operation; ⊕ denotes an exclusive or operation.

Figure 4:
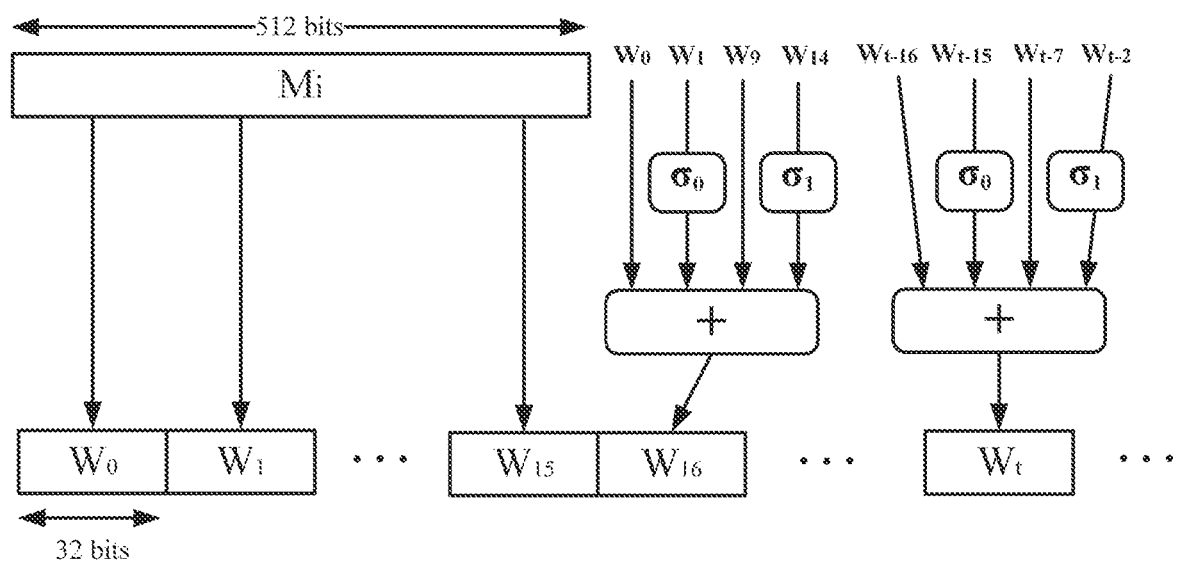
FIG. 4 illustrates a mapping structure for generating $W_t$.

It is described next how the 32-bit word $W_t$ is derived from a 512-bit data block $M_i$. FIG. 4 illustrates a mapping structure for generating Wt. As shown in FIG. 4, $W_t$ is obtained according to the following expression:

For 0≤t≤15: $W_t$ is directly taken from the data block Mi;
For 16≤t≤63:

$$W_t = \sigma_1(W_{t-2}) + W_{t-7} + \sigma_0(W_{t-15}) + W_{t-16} \quad \text{(Expression 2)}$$

Wherein:

$\sigma_0(x) = ROTR^7(x) \oplus ROTR^{18}(x) \oplus SHR^3(x)$ $\sigma_1(x) = ROTR^{17}(x) \oplus ROTR^{19}(x) \oplus SHR^{10}(x)$ Wherein, $ROTR^n$ (x) represents circularly right shifting the 32-bit variable x by n bits; $SHR^n(x)$ denotes shifting the 32-bit variable x to the right by n bits, and padding 0 on the right; ⊕ denotes exclusive or operation; + denotes modulo $2^{32}$ addition.

The SHA-256 algorithm has the following characteristic: each bit of the generated hash code is a function of all input bits. Multiple complex and repeated operations of the round operation f makes the results sufficiently confused, so that two data are randomly selected and even if they have similar characteristics, it is unlikely to produce repeated hash codes.

Those skilled in the art will appreciate that the above detailed description of SHA-256 is intended to more clearly present the inventive concepts of the present application and is not intended to be in any way limiting. The SHA-256 discussed herein includes any known version of SHA-256 and variations and modifications thereof.

For multiple rounds of repeated operation in the hash algorithm, a pipeline structure can be adopted to operate multiple sets of different data in parallel so as to improve the operation efficiency. Taking the implementation of SHA-256 algorithm as an example, since 64 rounds of repeated operations are performed on each 512-bit data block, a 64-stage pipeline structure can be used to operate 64 sets of data in parallel.

Figure 5:
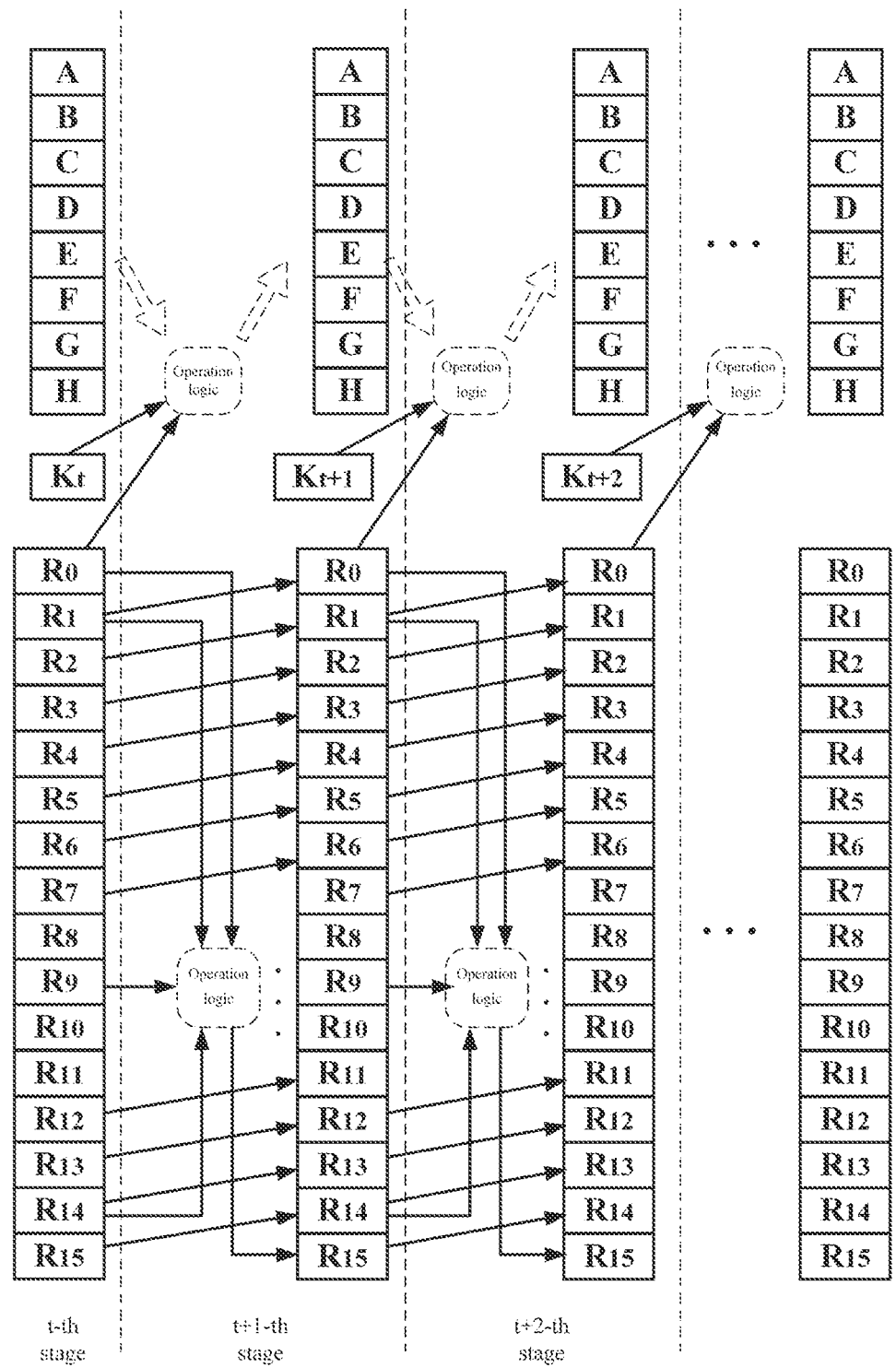
FIG. 5 illustrates a schematic diagram of a pipeline structure for performing round operation in a circuit for implementing SHA-256.

FIG. 5 illustrates a schematic diagram of a pipeline structure for performing round operation in a circuit for implementing SHA-256. As shown in FIG. 5, the t-th operation stage, the t+1-th operation stage, and the t+2-th operation stage in the pipeline structure are divided by dotted lines. Wherein each operation stage includes 8 32-bit registers A to H for storing intermediate values and 16 32-bit registers $R_0$ to $R_{15}$ for storing extension data $W_t$ to $W_{t+15}$, respectively. Referring to the Expression 2 above, for calculating the extension data $W_{t+16}$, data $W_{t+14}$, $W_{t+9}$, $W_{t+1}$, $W_t$ are required, that is, data spaced 16 rounds apart at most are required, so that each operation stage of the pipeline includes 16 registers $R_0$ to $R_{15}$ for storing extension data $W_t$ to $W_{t+15}$ of 16 consecutive rounds, thereby enabling the next extension data Wt+16 to be calculated.

In the round operation of the hash algorithm, there are a large number of data shift operations. Taking SHA-256 as an example, as can be seen by referring to FIG. 5 and Expression 2, in each operation stage, data in the registers $R_0$, $R_1$, $R_9$ and $R_{14}$ need to be used to calculate data to be stored in the register R15 of the next operation stage, while data in the remaining registers $R_2$ to $R_8$ and $R_{10}$ to $R_{13}$ need not be subjected to logic operation, but are directly shifted into the corresponding registers of the next operation stage through hard wiring. Moreover, data in the register $R_{13}$ is shifted to the registers $R_{12}$, $R_{11}$ and $R_{10}$ in order without taking part in logic operations other than data shift, which makes a data shift path $R_{13}$-$R_{12}$-$R_{11}$-$R_{10}$ that does not participate in logic operations other than data shift, and similarly another data shift path $R_8$-$R_7$-$R_6$-$R_5$-$R_4$-$R_3$-$R_2$, exist in the pipeline structure.

The inventor of the present application believes that there is room for further optimization for pipeline structures, particularly those containing data shift paths, that include registers that are used only for data shift and do not participate in logic operations (e.g., registers $R_2$ to R8 and $R_{10}$ to $R_{13}$). In the existing pipeline structure for implementing hash operations, all registers are controlled by the same clock signal, so that in each clock cycle, all registers need to be flipped to store new data. However, for a register only used for data shift and not involved in logic operation, the flip operation is actually not necessary, which will cause a waste of power consumption.

Based on this, the inventor of the present application thinks that a reduced frequency can be used to control registers that are used for only data shift and do not participate in logic operation (for example, extension registers $R_2$ to $R_8$ and $R_{10}$ to $R_{13}$) in the operation stage so as to reduce redundant flipping of the registers, thereby reducing power consumption. In addition, since the logic operation for generating intermediate values (for example, see Expression 1) is more complicated than the logic operation for generating extension data (for example, see Expression 2), a critical path in the pipeline structure of the hash operation generally occurs in the logic hardware for calculating the intermediate values, and thus there is a certain timing redundancy in the logic hardware for calculating the extension data, which causes no new critical path to appear (i.e., does not cause a reduction in the highest operating frequency) even though some modification is made to the logic hardware for calculating the extension data, thereby providing convenience in improving the pipeline structure.

Figure 6:
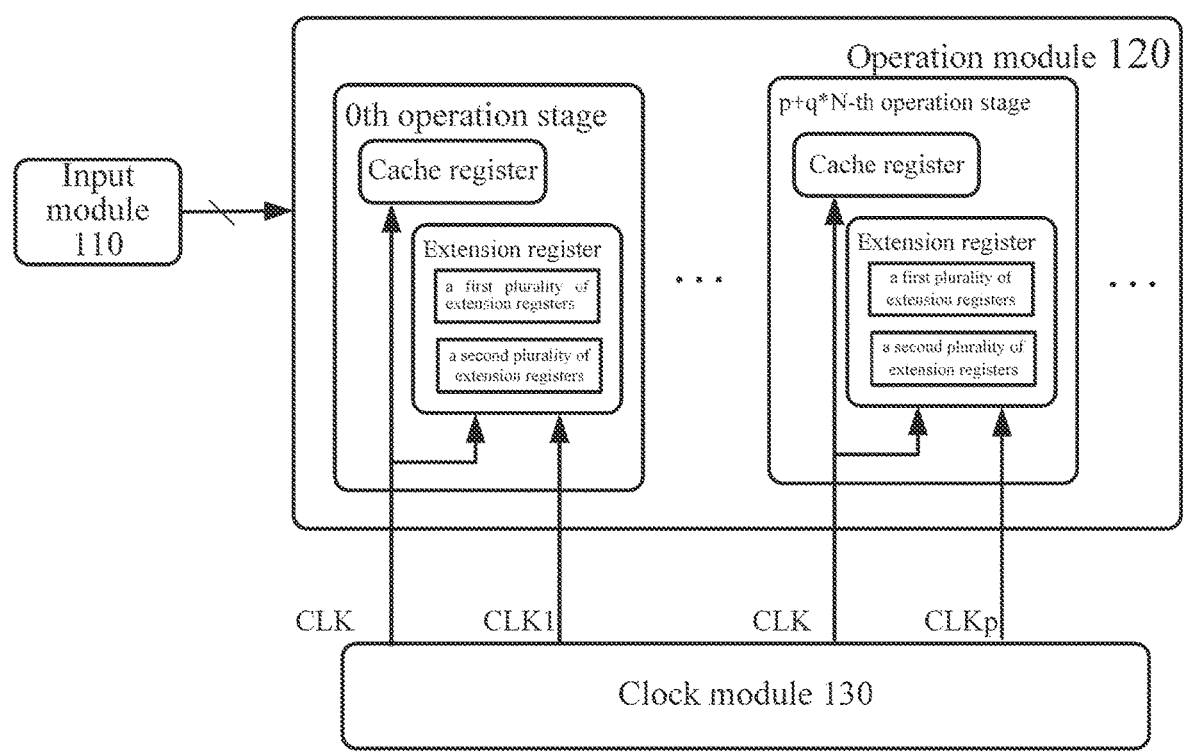
FIG. 6 schematically illustrates a circuit for performing a hash algorithm according to an embodiment of the present disclosure.

FIG. 6 shows a circuit 100 for performing a hash algorithm according to an embodiment of the present disclosure, the circuit 100 comprising: an input module 110 for receiving data; and an operation module 120 for calculating a hash value based on the received data. The operation module 120 includes a plurality of operation stages arranged in a pipeline structure, including a 0th operation stage, a 1st operation stage, up to a P-th operation stage, P being a fixed positive integer greater than 1 and less than the number of operation stages in the pipeline structure. For the sake of clarity of the drawing, only two operation stages are schematically shown in FIG. 1.

Each of the 1st to P-th operation stages may include: a plurality of cache registers for storing intermediate values of a current operation stage and operating at a first frequency; and a plurality of extension registers for storing extension data of a current operation stage, and including a first set of extension registers operating at a first frequency and a second set of extension registers operating at a second frequency. Where the second frequency is 1/N times of the first frequency, and N is a fixed positive integer which is greater than 1 and not greater than the number of the extension registers in the second set of extension registers. In an embodiment according to the present disclosure, the second set of extension registers may be registers in respective operation stages only for data shift without participating in a logic operation, and the size of N may depend on the length of the data shift path in the pipeline structure. In some embodiments according to the present disclosure, the SHA-256 is implemented with the circuit 100, the plurality of cache registers may include registers A through H for storing intermediate values, the plurality of extension registers may include registers $R_0$ to $R_{15}$ for storing extension data, and the data shift path may be $R_{13}$-$R_{12}$-$R_{11}$-$R_{10}$ or $R_8$-$R_7$-$R_6$-$R_5$-$R_4$-$R_3$-$R_2$.

In an embodiment according to the present disclosure, the 0th operation stage to the P-th operation stage are consecutive (P+1) operation stages in the pipeline structure, and the pipeline structure may further include other operation stages other than the 0th operation stage to the P-th operation stage, for example, may include one or more operation stages connected before the 0th operation stage, and/or may include one or more operation stages connected after the P-th operation stage. In some embodiments according to the present disclosure, other operation stages than the 0th operation stage to the P-th operation stage in the pipeline structure may include structures similar to the 0th operation stage to the P-th operation stage. For example, the pipeline structure may include 64 operation stages in total, in which the first 12 operation stages adopt the structures from the 0th operation stage to the P-th operation stage as described above (at this time, P takes a value of 11, and N may take a value of 3, for example), and the 13th to 18th operation stages also adopt the structures from the 0th operation stage to the P-th operation stage as described above (at this time, P takes a value of 5, and N may take a value of 3, for example).

In an embodiment according to the present disclosure, the plurality of cache registers and the plurality of extension registers may include edge triggered registers, such as rising edge triggered registers and/or falling edge triggered registers. The plurality of cache registers and the plurality of extension registers may include D flip-flops (DFFs) and/or latches (Latch), and the latches may be, for example, latches employing a pulse type clock signal.

With continued reference to FIG. 6, the circuit 100 for performing a hash algorithm further comprises a clock module 130 that may be used to provide a reference clock signal CLK. The reference clock signal CLK has a first frequency and a reference clock period corresponding to the first frequency, and a plurality of cache registers and a first set of extension registers of each of the 1st operation stage to the P-th operation stage operate based on the reference clock signal. Among the plurality of operation stages of the operation module 120, each of the 1st operation stage to the P-th operation stage is configured to: generate, during each reference clock cycle, intermediate values for storage in a plurality of cache registers of a current operation stage based on extension data from at least one of a first set of extension registers in an adjacent previous operation stage.

In some embodiments according to the present disclosure, among the plurality of operation stages of the operation module 120, each of the N-th operation stage to the P-th operation stage may be configured to: generate, during each reference clock cycle, extension data for storage in a first set of extension registers of a current operation stage based on extension data in at least one extension register in adjacent previous N operation stages of the current operation stage. The $i+j_1*N$-th operation stage may be configured to generate, during a $C_1+i+k*N$-th reference clock cycle, extension data for storage in a second set of extension registers of the current operation stage based on the extension data in at least one extension register in adjacent previous N operation stages of the current operation stage. Wherein N is defined as described above, i.e., a fixed positive integer greater than 1, and the second frequency is 1/N times the first frequency; $C_1$ is a fixed positive integer whose size depends on the number of clock cycles required for data initialization at the initial stage of startup of circuit 100; i is 0 or any positive integer less than N, $j_1$ is any positive integer less than P/N, and k is 0 or any positive integer. For example, if N=2, i is 0 or 1, the 2nd operation stage generates extension data for storage in a second set of extension registers of the 2nd operation stage based on the extension data in at least one extension register in the 0th operation stage and the 1st operation stage during the reference clock cycles of $C_1$, $C_1+2$, $C_1+4$, $C_1+6$, etc.; the 3rd operation stage generates extension data for storage in a second set of extension registers of the 3rd operation stage based on the extension data in at least one extension register in the 1st operation stage and the 2nd operation stage during the reference clock cycles of the $C_1+1$, $C_1+3$, $C_1+5$, $C_1+7$, etc.; the 4th operation stage generates extension data for storage in a second set of extension registers of the 4th operation stage based on the extension data in at least one extension register in the 2nd operation stage and the 3rd operation stage during the reference clock cycles of $C_1$, $C_1+2$, $C_1+4$, $C_1+6$, etc., and so on.

In some embodiments according to the present disclosure, the 0th operation stage may be configured to determine extension data in a plurality of extension registers in the 0th operation stage based on data received by the input module 110.

In some embodiments according to the present disclosure, control of the various operation stages as described above may be achieved by generating a plurality of different clock signals using the clock module 130. Specifically, in addition to the reference clock signal CLK, the clock module 130 may also be configured to generate the 1st clock signal CLK1 to the N-th clock signal CLKN having a second frequency. Where the rising edges of the 1st clock signal CLK1 to the N-th clock signal CLKN are aligned with the rising edge of the reference clock signal, and the rising edge of each of the 2nd clock signal to the N-th clock signal is one reference clock cycle later than the rising edge of its previous clock signal, e.g., the rising edge of the 2nd clock signal is one reference clock cycle later than the rising edge of the 1st clock signal, the rising edge of the 3rd clock signal is one reference clock cycle later than the rising edge of the 2nd clock signal, and so on.

Note that herein when referring to a certain clock signal, it is not intended to mean a certain pulse signal that actually exists in the circuit, but may mean one or more pulse signals having a certain frequency and phase that actually exist in the circuit. Taking FIG. 6 as an example, although it is described herein that all of the plurality of cache registers of each operation stage operates based on the reference clock signal CLK, the reference clock signal CLK used by each of the 0th operation stage and the $p+q*N$-th operation stage may be one of two independent pulse signals generated by the clock tree in the clock module 130, each having the frequency and phase required by the reference clock signal CLK.

Accordingly, the second set of extension registers in the $p+q*N$-th operation stage operate based on the p-th clock signal, P is any positive integer not greater than N, q is 0 or any positive integer such that $(p+q*N)$ is not greater than P is satisfied, i.e., the clock signals used by the respective second set of extension registers of any two adjacent operation stages have the same frequency as each other and have rising edges different by one reference clock cycle. For example, the second set of extension registers in the 1st operation stage operate based on the 1st clock signal CLK1, the second set of extension registers in the 2nd operation stage operate based on the 2nd clock signal CLK2, the second set of extension registers in the 3rd operation stage operate based on the 1st clock signal CLK1, the second set of extension registers in the 4th operation stage operate based on the 2nd clock signal CLK2, and so on.

In some embodiments according to the present disclosure, an output of one of the first set of extension registers of each of the 1st operation stage to the P-N-th operation stage may be coupled to an input of one of the second set of extension registers of each of the adjacent next N operation stages. An input of one of the first set of extension registers of each of the N+1-th operation stage to the P-th operation stage may be coupled to an output of one of the second set of extension registers of each of the adjacent previous N operation stages through an N-to-1 multiplexer. Specifically, since the first frequency is N times the second frequency, the data throughput rate of the registers operating at the first frequency is N times the data throughput rate of the registers operating at the second frequency. Thus, if it is desired to connect the output of a register operating at a first frequency to the input of a register operating at a second frequency, it is possible for the output of the register operating at a first frequency to connect to N registers operating at the second frequency. Vice versa, if it is desired to connect the output of a register operating at the second frequency to the input of a register operating at the first frequency, the outputs of N registers operating at the second frequency may be connected to one register operating at the first frequency through an N-to-1 multiplexer. When the output of a register operating at the second frequency needs to be connected to the input of another register operating at the second frequency, the connections can be made in a one-to-one manner because the frequency is consistent, but (N-1) operation stages need to be skipped.

In some implementations according to the present disclosure, the plurality of extension registers of each of the 1st operation stage to P-th operation stage may further include a third set of extension registers operating at a third frequency, wherein the third frequency is 1/M times the first frequency, M being a fixed positive integer greater than 1, less than the number of extension registers in the third set of extension registers, and not equal to N. Wherein the $r+j_2*M$-th operation stage may be configured to generate, during the $C_2+r+k*M$-th reference clock cycle, extension data for storage in a third set of extension registers of the current operation stage based on the extension data in at least one extension register in adjacent previous M operation stages of the current operation stage. Wherein, $C_2$ is a fixed positive integer whose size depends on the number of clock cycles required for data initialization at the initial stage of the startup of the circuit; r is 0 or any positive integer less than M, $j_2$ is any positive integer less than P/M, and k is 0 or any positive integer. In some embodiments, the clock module may be configured accordingly to generate M clock signals for controlling the third set of extension registers.

The circuit 100 for performing a hash algorithm according to embodiments of the present disclosure may be used to implement the SHA-256 algorithm, and may implement the SHA-256 algorithm in a number of different configurations. Those skilled in the art will appreciate that the circuit and method for implementing a hash algorithm according to embodiments of the present disclosure is applicable to any hash algorithm and may even further be applied to any circuit and method that may employ a pipeline structure and that has data shifts, and are not limited solely to implementing SHA-256.

In some embodiments employing a circuit 100 according to the present disclosure to implement the SHA-256 algorithm, a plurality of extension registers of each operation stage may include 16 32-bit registers $R_0$ to $R_{15}$. The registers $R_0$ to $R_{15}$ are used to store the extension data $W_t$ to $W_{t+15}$, respectively, and thus participate in the operation as shown in the Expression 2. In round operation of the SHA-256, there is one data shift path $R_{13}$-$R_{12}$-$R_{11}$-$R_{10}$ and another data shift path $R_8$-$R_7$-$R_6$-$R_5$-$R_4$-$R_3$-$R_2$, and the registers in these data shift paths may be used as the second or third set of extension registers in the operation stage, while the remaining registers $R_0$, $R_1$, $R_9$, $R_{14}$ and $R_{15}$ may be used as the first set of extension registers in the operation stage.

In some preferred embodiments employing the circuit 100 according to the present disclosure to implement the SHA-256 algorithm, the second set of extension registers includes registers $R_2$ to $R_8$ and $R_{10}$ to $R_{13}$. Since the length of the shorter data shift path $R_{13}$-$R_{12}$-$R_{11}$-$R_{10}$ in the second set of extension registers is 4 (i.e., includes 4 serially shifted registers), the maximum value of N is 4, i.e., N may be 2, 3, or 4. Accordingly, the operating frequency of the second set of extension registers $R_2$ to $R_8$ and $R_{10}$ to $R_{13}$ may be 1/N of the operating frequency of the first set of extension registers $R_0$, $R_1$, $R_9$, $R_{14}$ and $R_{15}$, and thus the power consumption of the second set of extension registers $R_2$ to $R_8$ and $R_{10}$ to $R_{13}$ may be reduced by (N−1)/N accordingly.

In other preferred embodiments that implement the SHA-256 algorithm using the circuit 100 according to the present disclosure, different frequencies may be used to control the two sets of registers $R_2$ to $R_8$ and $R_{10}$ to $R_{13}$, respectively. For example, the second set of extension registers may include registers $R_2$ to $R_8$, while the third set of extension registers may include registers $R_{10}$ to $R_{13}$. Accordingly, the second set of extension registers $R_2$ to $R_8$ are controlled by the second frequency, and the third set of extension registers $R_{10}$ to $R_{13}$ are controlled by the third frequency, and the control of the two sets of extension registers are independent and do not influence each other. Since the length of the data shift path $R_8$-$R_7$-$R_6$-$R_5$-$R_4$-$R_3$-$R_2$ in the second set of extension registers is 7, the maximum value of N is 7, i.e., N=2, 3, 4, 5, 6, or 7. Accordingly, the operating frequency of the second set of extension registers $R_2$ to $R_8$ may be 1/N of the operating frequency of the plurality of extension registers $R_0$, $R_1$, $R_9$, $R_{14}$ and $R_{15}$, and thus the power consumption of the second set of extension registers $R_2$ to $R_8$ may be reduced by (N−1)/N accordingly. Since the length of the data shift path $R_{13}$-$R_{12}$-$R_{11}$-$R_{10}$ in the third set of extension registers is 4, the maximum value of M is 4, i.e., M=2, 3, or 4. Accordingly, the operating frequency of the third set of extension registers $R_{10}$ to $R_{13}$ may be 1/M of the operating frequency of the plurality of extension registers $R_0$, $R_1$, $R_9$, $R_{14}$ and $R_{15}$, and thus the power consumption of the third set of extension registers $R_{10}$ to $R_{13}$ may be reduced by (M−1)/M accordingly. Advantageously, the power consumption computing power ratio of the circuit for implementing a hash algorithm in accordance with the embodiments of the present disclosure is significantly improved.

In still other preferred embodiments that implement the SHA-256 algorithm using the circuit 100 according to the present disclosure, the extension registers that participate in the logic operation may also be frequency down-controlled. For example, the register $R_9$ is used for not only data shift but also logic operation of each operation stage, but the registers $R_8$ and $R_{10}$ having a data shift relationship with the register $R_9$ are registers only used for data shift, and therefore, the register $R_9$ can also be frequency down-controlled. Although this may result in additional modifications to other parts of the circuit 100, the two data shift paths $R_{13}$-$R_{12}$-$R_{11}$-$R_{10}$ and $R_8$-$R_7$-$R_6$-$R_5$-$R_4$-$R_3$-$R_2$ may be connected together, thereby implementing an ultra-long data shift path from $R_{13}$ to $R_2$. Additional modifications to other parts of the circuit 100 may include, for example, modifications to the hardware part associated with using the output of register $R_9$, for example, if the output of register $R_9$ is hardwired to the hardware part performing logic operations prior to the modification, it may be necessary to connect the output of register $R_9$ and the output of another register to the hardware part performing logic operations through a 1-out-of-2 multiplexer after the modification. In some embodiments, the first set of extension registers includes registers $R_0$, $R_1$, $R_9$, $R_{14}$ and $R_{15}$, then the second set of extension registers includes registers $R_2$ to $R_{13}$, since the length of the data shift path is extended to 12, the maximum value of N may be 12, i.e., N may be 2, 3, 4, 5, 6, 7, 8, 9, 10, 11, or 12. Accordingly, the operating frequency of the second set of extension registers $R_2$ to $R_{13}$ may be 1/N of the operating frequency of the plurality of extension registers $R_0$, $R_1$, $R_9$, $R_{14}$ and $R_{15}$, and thus the power consumption of the second set of extension registers $R_2$ to $R_{13}$ may be reduced by (N−1)/N accordingly.

Figure 7A:
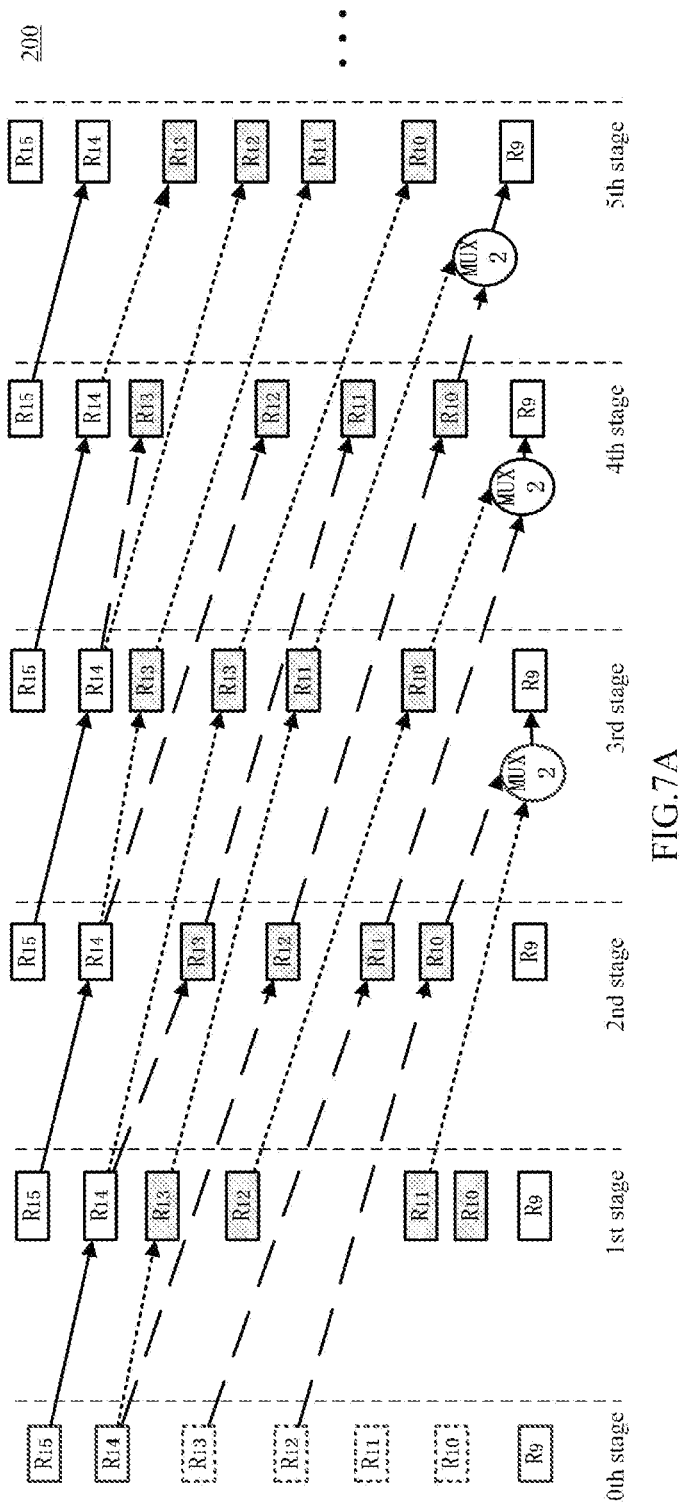
FIG. 7A exemplarily illustrates a schematic diagram of a partial structure of the circuit for performing SHA-256 according to an embodiment of the present disclosure, and FIG. 7B schematically illustrates clock signals employed by the circuit for performing SHA-256 in FIG. 7A.
Figure 7B:
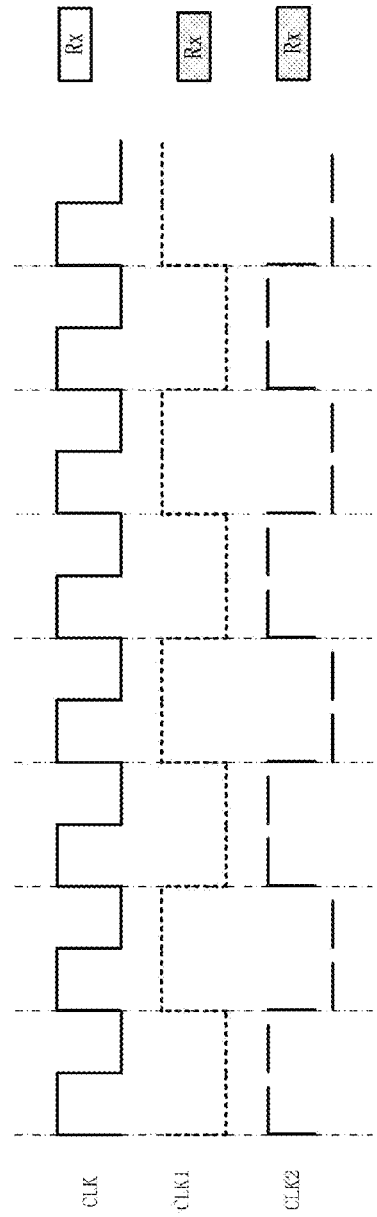

FIG. 7A exemplarily illustrates a schematic diagram of a partial structure of a circuit 200 for performing SHA-256 according to an embodiment of the present disclosure, and FIG. 7B schematically illustrates clock signals employed by the circuit for performing SHA-256 in FIG. 7A. The circuit 200 shown in FIG. 7A is one specific example of employing the circuit 100 shown in FIG. 6 to perform SHA-256, and therefore all of the foregoing description regarding the circuit 100 for performing a hash algorithm applies here. Note that, in order to make the drawing clearer, FIG. 7A only schematically shows partial connection relationship of a part of the structure of the circuit 200 for performing SHA-256, for example, some registers in the drawing are not connected with any arrow indicating data shift, but this does not mean that the registers do not participate in the operation, it is only not shown in the drawing.

In the circuit for performing SHA-256 shown in FIG. 7A, the plurality of extension registers of each operation stage may include 16 32-bit registers $R_0$ to $R_{15}$. The registers $R_0$ to $R_{15}$ are used to store the extension data $W_t$ to $W_{t+15}$, respectively, and thus participate in the operation as shown in the Expression 2. The second set of extension registers includes registers $R_{10}$ to $R_{13}$, and the second frequency is ½ the first frequency, i.e., N=2.

Arrows in FIG. 7A indicate the shift relationship of data between registers. The line types of the arrows are consistent with the line types of the clock signals represented by them, and three different arrows correspond to the reference clock signal CLK, the 1st clock signal CLK1, and the 2nd clock signal CLK2, respectively. The line type of each arrow indicates whether the clock signal employed by the register to which the arrow points is CLK, CLK1 or CLK2. The clock signals used by the registers are also distinguished in FIG. 7A by different patterns of the registers, as shown in FIG. 7B, the patterns of the registers using the clock signals CLK, CLK1 and CLK2 are placed after the respective clock signals as illustration. The registers shown in FIG. 7A with a dashed box indicate that the clock signals used in the registers can be flexibly determined according to specific needs.

In the embodiments according to the present disclosure, the plurality of cache registers and the plurality of extension registers may employ rising edge triggered registers, and may also employ falling edge triggered registers. Those skilled in the art will appreciate that FIG. 7B shows the clock signals required for a register triggered by a rising edge, and by inverting these clock signals by 180°, the clock signals required for a register triggered by a falling edge can be obtained.

As shown in FIGS. 7A and 7B, the registers $R_9$ and $R_{15}$ in the first set of extension registers in each operation stage operate in accordance with the reference clock signal CLK.

With further reference to FIGS. 7A and 7B, the $i+j_1*2$-th operation stage is configured such that it generates, during a $C_1+i+k*2$-th reference clock cycle, extension data to be stored in the second set of extension registers $R_{10}$ to $R_{13}$ of the current operation stage based on the extension data in at least one extension register in adjacent previous 2 operation stages of the current operation stage. Where $C_1$ is a fixed positive integer whose size depends on the number of clock cycles required for data initialization at the initial stage of the startup of the circuit 100; i is 0 or 1, $j_1$ is any positive integer less than P/2, and k is 0 or any positive integer.

With continued reference to FIGS. 7A and 7B, the second set of extension registers $R_{10}$ to $R_{13}$ in the $p+q*2$-th operation stages operates based on the p-th clock signal CLKp, where p is 1 or 2, q is 0 or any positive integer such that $(p+q*2)$ is not greater than P is satisfied. Specifically, the second set of extension registers R10 to $R_{13}$ in the $1+q*2$-th operation stages such as the 1st operation stage, the 3rd operation stage, the 5th operation stage, and the like operate based on the 1st clock signal CLK1; the second set of extension registers $R_{10}$ to $R_{13}$ in the $2+q*2$-th operation stages such as the 2nd operation stage, the 4th operation stage, and the like operate based on the 2nd clock signal CLK2. Wherein rising edges of the 1st clock signal CLK1 and the 2nd clock signal CLK2 are aligned with rising edges of the reference clock signal CLK, and the rising edge of the 2nd clock signal CLK2 is one reference clock cycle later than the rising edge of the 1st clock signal CLK1.

Figure 8A:
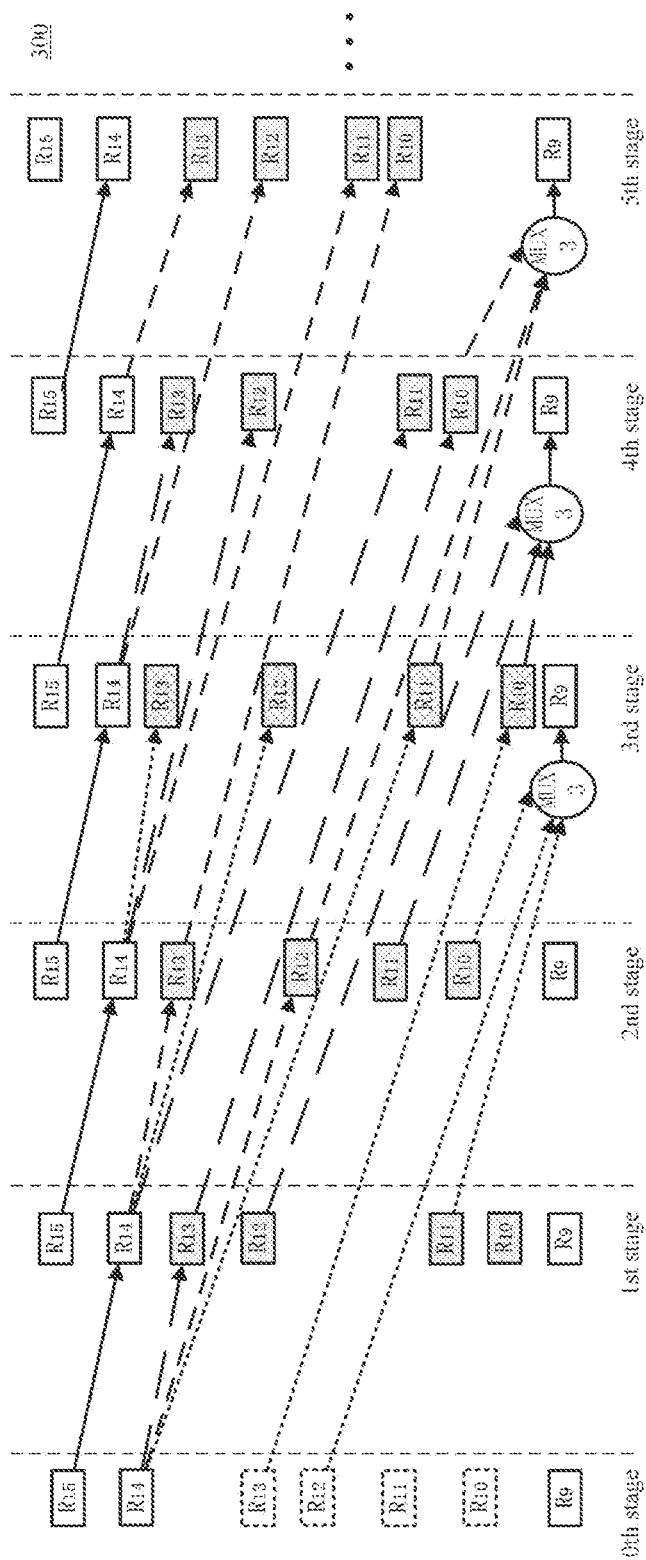
FIG. 8A exemplarily illustrates a schematic diagram of a partial structure of the circuit for performing SHA-256 according to an embodiment of the present disclosure, and FIG. 8B schematically illustrates clock signals employed by the circuit for performing SHA-256 in FIG. 8A.
Figure 8B:
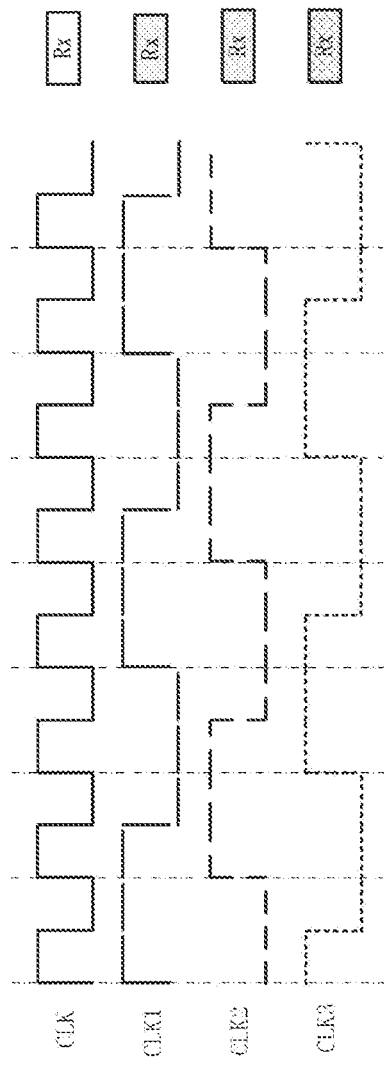

FIG. 8A exemplarily illustrates a schematic diagram of a partial structure of a circuit 300 for performing SHA-256 according to an embodiment of the present disclosure, and FIG. 8B schematically illustrates clock signals employed by the circuit for performing SHA-256 in FIG. 8A. The circuit 300 shown in FIG. 8A is one specific example of employing the circuit 100 shown in FIG. 6 to perform SHA-256, and therefore all of the foregoing description regarding the circuit 100 for performing a hash algorithm applies here. Note that, in order to make the drawing clearer, FIG. 8A only schematically shows partial connection relationship of a part of the structure of the circuit 300 for performing SHA-256, for example, some registers in the drawing are not connected with any arrow indicating data shift, but this does not mean that the registers do not participate in the operation, it is only not shown in the drawing.

In the circuit for performing SHA-256 shown in FIG. 8A, the plurality of extension registers of each operation stage may include 16 32-bit registers $R_0$ to $R_{15}$. The registers $R_0$ to $R_{15}$ are used to store the extension data $W_t$ to $W_{t+15}$, respectively, and thus participate in the operation as shown in the Expression 2. The second set of extension registers includes registers $R_{10}$ to $R_{13}$, and the second frequency is ⅓ the first frequency, i.e., N=3.

Arrows in FIG. 8A indicate the shift relationship of data between registers. The line types of the arrows are consistent with the line types of the clock signals represented by them, and four different arrow types correspond to the reference clock signal CLK, the 1st clock signal CLK1, the 2nd clock signal CLK2, and the 3rd clock signal CLK3, respectively. The line type of each arrow indicates whether the clock signal employed by the register to which the arrow points is CLK, CLK1 or CLK2, CLK3. The clock signals used by the registers are also distinguished in FIG. 8A by different patterns of the registers, as shown in FIG. 8B, the patterns of the registers using the clock signals CLK, CLK1, CLK2 and CLK3 are placed after the respective clock signals as illustration. The registers shown in FIG. 8A with a dashed box indicate that the clock signals used in the registers can be flexibly determined according to specific needs.

In the embodiments according to the present disclosure, the plurality of cache registers and the plurality of extension registers may employ rising edge triggered registers, and may also employ falling edge triggered registers. Those skilled in the art will appreciate that FIG. 8B shows the clock signals required for a register triggered by a rising edge, and by inverting these clock signals by 180°, the clock signals required for a register triggered by a falling edge can be obtained.

As shown in FIGS. 8A and 8B, the registers $R_9$ and $R_{15}$ in the first set of extension registers in each operation stage operate in accordance with the reference clock signal CLK.

With further reference to FIGS. 8A and 8B, the $i+j_1*3$-th operation stage is configured such that it generates, during a $C_1+i+k*3$-th reference clock cycle, extension data to be stored in the second set of extension registers $R_{10}$ to $R_{13}$ of the current operation stage based on the extension data in at least one extension register in adjacent previous 3 operation stages of the current operation stage. Where $C_1$ is a fixed positive integer whose size depends on the number of clock cycles required for data initialization at the initial stage of the startup of the circuit 100; i is 0, 1 or 2, $j_1$ is any positive integer less than P/3, and k is 0 or any positive integer.

With continued reference to FIGS. 8A and 8B, the second set of extension registers $R_{10}$ to $R_{13}$ in the $p+q*3$-th operation stage operates based on the p-th clock signal CLKp, where p is 1, 2 or 3, q is 0 or any positive integer such that $(p+q*3)$ is not greater than P is satisfied. Specifically, the second set of extension registers $R_{10}$ to $R_{13}$ in the $1+q*3$ operation stages such as the 1st operation stage, the 4th operation stage, and the like operate based on the 1st clock signal CLK1; the second set of extension registers $R_{10}$ to $R_{13}$ in the 2+q*3 operation stages such as the 2nd operation stage, the 5th operation stage, and the like operate based on the 2nd clock signal CLK2; the second set of extension registers $R_{10}$ to $R_{13}$ in the 3+q*3-th operation stages such as the 3rd operation stage and the like operate based on the 3rd clock signal CLK3. Wherein rising edges of the 1st clock signal CLK1, 2nd clock signal CLK2, and 3rd clock signal CLK3 are aligned with rising edges of the reference clock signal CLK, the rising edge of the 2nd clock signal CLK2 is one reference clock cycle later than the rising edge of the 1st clock signal CLK1, and the rising edge of the clock signal CLK3 is one reference clock cycle later than the rising edge of the 2nd clock signal CLK2.

According to an embodiment of the present disclosure, there is also provided an apparatus for performing a data processing algorithm (for example, a Bitcoin mining algorithm), which includes a circuit, such as circuit 100, circuit 200 or circuit 300, for performing a hash algorithm in accordance with the foregoing. The circuit for performing a hash algorithm as set forth in this disclosure is well suited for implementing the SHA-256 algorithm, and thus the data processing apparatus (e.g., a Bitcoin machine), with a reduced power consumption computing power ratio. Advantageously, the power consumption computing power of the apparatus for performing a data processing algorithm according to an embodiment of the present disclosure has significant advantages.

There is also provided, in accordance with an embodiment of the present disclosure, a method for performing an algorithm that employs a circuit in accordance with the present disclosure to perform the algorithm. Specifically, the method may comprise: receiving data using an input module; and calculating a hash value using an operation module based on the received data. The operation module may include a plurality of operation stages arranged in a pipeline structure, including, for example, a 0th operation stage, a 1st operation stage, up to a P-th operation stage, P being a fixed positive integer greater than 1 and less than the number of operation stages in the pipeline structure. Each of the 1st to P-th operation stages may include: a plurality of cache registers for storing intermediate values of a current operation stage and operating at a first frequency, and a plurality of extension registers for storing extension data of the current operation stage. The plurality of extension registers may include a first set of extension registers operating at the first frequency and a second set of extension registers operating at a second frequency, wherein the second frequency is 1/N times the first frequency, and N is a fixed positive integer greater than 1 and no greater than the number of extension registers in the second set of extension registers.

In some embodiments according to the present disclosure, the plurality of cache registers and the plurality of extension registers may include edge triggered registers, such as rising edge triggered registers and/or falling edge triggered registers. The plurality of cache registers and the plurality of extension registers may include D flip-flops and/or latches, and the latches may be, for example, latches employing a pulse type clock signal.

In some embodiments according to the present disclosure, a method for performing a hash algorithm may further include providing a reference clock signal using a clock module. The reference clock signal has a first frequency and a reference clock period corresponding to the first frequency, and the plurality of cache registers and the first set of extension registers of each of the 1st operation stage to the P-th operation stage operate based on the reference clock signal. Each of the 1st operation stage to the P-th operation stage may be configured to: generate, during each reference clock cycle, intermediate values for storage in a plurality of cache registers of a current operation stage based on extension data from at least one of a first set of extension registers in an adjacent previous operation stage. Each of the N-th operation stage to the P-th operation stage may be configured to: generate, during each reference clock cycle, extension data for storage in a first set of extension registers of a current operation stage based on extension data in at least one extension register in adjacent previous N operation stages of the current operation stage. The $i+j_1$*N-th operation stage may be configured to generate, during a $C_1+i+k$*N-th reference clock cycle, extension data for storage in a second set of extension registers of the current operation stage based on the extension data in at least one extension register in adjacent previous N operation stages of the current operation stage. Where $C_1$ is a fixed positive integer; i is 0 or any positive integer less than N, $j_1$ is any positive integer less than P/N, and k is 0 or any positive integer.

In some embodiments of the method for performing a hash algorithm according to the present disclosure, the clock module may be further configured to generate 1st clock signal to N-th clock signal having a second frequency, wherein rising edges of the 1st clock signal to the N-th clock signal are aligned with rising edges of the reference clock signal, and a rising edge of each of the 2nd clock signal to the N-th clock signal is one reference clock cycle later than a rising edge of its previous clock signal. The second set of extension registers in the p+q*N-th operation stage may operate based on the p-th clock signal, p being any positive integer not greater than N, q being 0 or any positive integer such that (p+q*N) is not greater than P is satisfied.

In some embodiments of a method for performing a hash algorithm according to the present disclosure, an output of one of the first set of extension registers of each of the 1st operation stage to the P-N-th operation stage may be coupled to an input of one of the second set of extension registers of each of the adjacent next N operation stages. An input of one of the first set of extension registers of each of the N+1-th operation stage to P-th operation stage may be coupled to an output of one of the second set of extension registers of each of the adjacent previous N operation stages through an N-to-1 multiplexer.

In some embodiments of a method for performing a hash algorithm according to the present disclosure, the plurality of extension registers of each of the 1st operation stage to P-th operation stage may further include a third set of extension registers operating at a third frequency, where the third frequency is 1/M times the first frequency, M being a fixed positive integer greater than 1, less than the number of extension registers in the third set of extension registers, and not equal to N. Accordingly, the $r+j_2$*M-th operation stage may be configured to generate, during a $C_2+r+k$*M-th reference clock cycle, extension data for storage in a third set of extension registers of the current operation stage based on the extension data in at least one extension register in adjacent previous M operation stages of the current operation stage; wherein $C_2$ is a fixed positive integer, r is 0 or any positive integer less than M, $j_2$ is any positive integer less than P/M, and k is 0 or any positive integer.

In some embodiments of a method for performing a hash algorithm according to the present disclosure, the method may be used to perform SHA-256, in which case the plurality of extension registers includes 16 32-bit registers $R_0$ to $R_{15}$, wherein a first set of extension registers includes registers $R_0$, $R_1$, $R_9$, $R_{14}$ and $R_{15}$, and a second set of extension registers includes registers $R_2$ to $R_8$ and registers $R_{10}$ to $R_{13}$, and wherein N=2, 3, or 4.

In some embodiments of a method for performing a hash algorithm according to the present disclosure, the method may be used to perform SHA-256, in which case the plurality of extension registers includes 16 32-bit registers $R_0$ to $R_{15}$, wherein a first set of extension registers includes registers $R_0$, $R_1$, $R_{14}$ and $R_{15}$, and a second set of extension registers includes registers $R_2$ to $R_{13}$, and wherein N=2, 3, 4, 5, 6, 7, 8, 9, 10, 11, or 12.

In some embodiments of a method for performing a hash algorithm according to the present disclosure, the method may be used to perform SHA-256, in which case the plurality of extension registers includes 16 32-bit registers $R_0$ to $R_{15}$, wherein a first set of extension registers includes registers $R_0$, $R_1$, $R_9$, $R_{14}$ and $R_{15}$, a second set of extension registers includes registers $R_{10}$ to $R_{13}$, a third set of extension registers includes registers $R_2$ to $R_8$, and wherein N=2, 3, 4, M=2, 3, 4, 5, 6, or 7.

There is also provided, in accordance with an embodiment of the present disclosure, a method for performing a data processing algorithm (e.g., a Bitcoin mining algorithm) including the steps of the method for performing a hash algorithm described hereinbefore.

In the embodiments shown and discussed here, any specific value shall be interpreted as only illustrative, instead of limitative. Hence, other embodiments of the illustrative embodiments may have different values.

The terms "front", "back", "top", "bottom", "over", "under" and the like in the description and in the claims, if any, are used for descriptive purposes and not necessarily for describing constant relative positions. It is to be understood that the terms thus used are interchangeable under appropriate circumstances such that the embodiments of the disclosure as described herein are, for example, capable of being operated in other orientations different than those as illustrated or otherwise described herein.

As used herein, the word "exemplary" means "serving as an example, instance, or illustration", instead of serving as a "model" that is to be accurately reproduced. Any implementation illustratively described herein is not necessarily to be construed as preferred or advantageous over other implementations. Furthermore, the present disclosure is not limited by any expressed or implied theory presented in the preceding parts of Technical Field, Background Art, Contents of the Invention or Embodiment.

As used herein, the term "substantially" is intended to encompass any minor variation caused by design or manufacturing imperfections, tolerances of devices or components, environmental influences, and/or other factors. The word "substantially" also allows for differences from a perfect or ideal situation due to parasitic effects, noise, and other practical considerations that may exist in a practical implementation.

The above description may indicate elements or nodes or features that are "connected" or "coupled" together. As used herein, the term "connecting" means one element/node/feature is electronically, mechanically, logically or otherwise directly connected (or directly communicates) with another element/node/feature, unless otherwise explicitly illustrated. Similarly, unless otherwise explicitly illustrated, the term "coupling" means one element/node/feature may be mechanically, electronically, logically or otherwise linked to another element/node/feature in a directly or indirect manner to allow an interaction therebetween, even if these two features may not be connected directly. In other words, the term "coupling" intends to include directly links and indirect links between elements or other features, including connections through one or more intermediate elements.

It will be further understood that the term "comprising/including", when used herein, specifies the presence of stated features, integers, steps, operations, units and/or components, but the presence or addition of one or more other features, integers, steps, operations, units and/or components, and/or combinations thereof are not excluded.

It shall be realized by those skilled in the art that boundaries between said operations are only illustrative. Multiple operations may be combined into a single operation, and a single operation may be distributed in additional operations, and moreover, the operations may be performed in an at least partially overlapping manner in time. Furthermore, optional embodiments may include multiple examples of specific operations, and the operation sequence may be changed in various other embodiments. However, other modifications, changes and replacements are also possible. Thus, the description and drawings shall be deemed as illustrative instead of limitative.

Although some specific embodiments of the present disclosure have been illustrated by ways of examples in detail, it shall be understood by those skilled in the art that the above examples are only illustrative, but shall by no means limit the scope of the present disclosure. The respective examples of the disclosure may be combined in any manner, without departure from spirits and scope of the present disclosure. It shall further be understood by those skilled in the art that multiple amendments may be made to the examples, without departure from the scope and spirits of the present disclosure. The scope of the present disclosure is defined by the attached claims.

What is claimed is:

1. A circuit for performing a hash algorithm, comprising:
an input module for receiving data; and
an operation module for calculating a hash value based on the received data, the operation module including a plurality of operation stages arranged in a pipeline structure, the plurality of operation stages including a 0th operation stage, a 1st operation stage, up to a P-th operation stage, wherein P is a fixed positive integer greater than 1 and less than the number of operation stages in the pipeline structure,
wherein each of the 1st operation stage to the P-th operation stage includes:
a plurality of cache registers for storing intermediate values of a current operation stage and operating at a first frequency, and
a plurality of extension registers for storing extension data of a current operation stage, and including a first set of extension registers operating at the first frequency and a second set of extension registers operating at a second frequency,
wherein the second frequency is 1/N times of the first frequency, and N is a fixed positive integer which is greater than 1 and not greater than the number of extension registers in the second set of extension registers, and
wherein an input of one extension register of a first set of extension registers of a current operation stage is coupled to an output of one of a second set of extension registers of each of the adjacent previous N operation stages of the current operation stage through an N-to-1 multiplexer.

2. The circuit of claim 1, further comprising:
a clock module for providing a reference clock signal having the first frequency and a reference clock period corresponding to the first frequency, wherein the plurality of cache registers and the first set of extension registers of each of the 1st operation stage to the P-th operation stage operate based on the reference clock signal;

wherein each of the 1st operation stage to the P-th operation stage is configured to: generate, during each reference clock cycle, intermediate values for storage in a plurality of cache registers of a current operation stage based on extension data from at least one of a first set of extension registers in an adjacent previous operation stage.

3. The circuit of claim 2, wherein each of a N-th operation stage to the P-th operation stage is configured to: generate, during each reference clock cycle, extension data for storage in a first set of extension registers of a current operation stage based on extension data in at least one extension register in adjacent previous N operation stages of the current operation stage;

wherein the $i+j_1*N$-th operation stage is configured to generate, during a $C_1+i+k*N$-th reference clock cycle, extension data for storage in a second set of extension registers of a current operation stage based on extension data in at least one extension register in adjacent previous N operation stages of the current operation stage; and wherein $C_1$ is a fixed positive integer; i is 0 or any positive integer less than N, $j_1$ is any positive integer less than P/N, and k is 0 or any positive integer.

4. The circuit of claim 2, wherein the clock module is further configured to generate 1st clock signal to N-th clock signal having the second frequency;

wherein rising edges of the 1st clock signal to the N-th clock signal are aligned with rising edges of the reference clock signal, and a rising edge of each of a 2nd clock signal to the N-th clock signal is one reference clock cycle later than a rising edge of its previous clock signal; and wherein a second set of extension registers in a $p+q*N$-th operation stage operates based on a p-th clock signal, p being any positive integer not greater than N, q being 0 or any positive integer such that (p+q*N) is not greater than P is satisfied.

5. The circuit of claim 3, wherein an output of one of a first set of extension registers of each of the 1st operation stage to P-N operation stage is coupled to an input of one of a second set of extension registers of each of the adjacent next N operation stages; and wherein an input of one of a first set of extension registers of each of N+1-th operation stage to the P-th operation stage is coupled to an output of one of a second set of extension registers of each of the adjacent previous N operation stages through an N-to-1 multiplexer.

6. The circuit of claim 2, wherein the plurality of extension registers of each of the 1st operation stage to the P-th operation stage further comprises a third set of extension registers operating at a third frequency, and wherein the third frequency is 1/M times of the first frequency, and M is a fixed positive integer which is greater than 1, less than the number of extension registers in the third set of extension registers and not equal to N.

7. The circuit of claim 6, wherein a $r+j_2*M$-th operation stage is configured to generate, during a $C_2+r+k*M$-th reference clock cycle, extension data for storage in a third set of extension registers of a current operation stage based on extension data in at least one extension register in adjacent previous M operation stages of the current operation stage; and wherein $C_2$ is a fixed positive integer, r is 0 or any positive integer less than M, $j_2$ is any positive integer less than P/M, and k is 0 or any positive integer.

8. The circuit of claim 1, wherein the circuit is used to perform SHA-256, wherein the plurality of extension registers includes 16 32-bit registers $R_0$ to $R_{15}$, wherein the first set of extension registers includes registers $R_0$, $R_1$, $R_9$, $R_{14}$ and $R_{15}$, the second set of extension registers includes registers $R_2$ to $R_8$ and registers $R_{10}$ to $R_{13}$, and wherein N=2, 3 or 4.

9. The circuit of claim 1, wherein the circuit is used to perform SHA-256, wherein the plurality of extension registers includes 16 32-bit registers $R_0$ to $R_{15}$, wherein the first set of extension registers includes registers $R_0$, $R_1$, $R_{14}$ and $R_{15}$, the second set of extension registers includes registers $R_2$ to $R_{13}$, and wherein N=2, 3, 4, 5, 6, 7, 8, 9, 10, 11, or 12.

10. The circuit of claim 6, wherein the circuit is used to perform SHA-256, wherein the plurality of extension registers includes 16 32-bit registers $R_0$ to $R_{15}$, wherein the first set of extension registers includes registers $R_0$, $R_1$, $R_9$, $R_{14}$ and $R_{15}$, the second set of extension registers includes registers $R_{10}$ to $R_{13}$, the third set of extension registers includes registers $R_2$ to $R_8$, and wherein N=2, 3, 4, M=2, 3, 4, 5, 6, or 7.

11. The circuit of claim 1, wherein the plurality of cache registers and the plurality of extension registers comprise at least one of D flip-flops and latches.

12. An apparatus for performing a data processing algorithm, comprising a circuit comprising:

an input module for receiving data; and an operation module for calculating a hash value based on the received data, the operation module including a plurality of operation stages arranged in a pipeline structure, the plurality of operation stages including a 0th operation stage, a 1st operation stage, up to a P-th operation stage, wherein P is a fixed positive integer greater than 1 and less than the number of operation stages in the pipeline structure, wherein each of the 1st operation stage to the P-th operation stage includes:

a plurality of cache registers for storing intermediate values of a current operation stage and operating at a first frequency, and a plurality of extension registers for storing extension data of a current operation stage, and including a first set of extension registers operating at the first frequency and a second set of extension registers operating at a second frequency, wherein the second frequency is 1/N times of the first frequency, and N is a fixed positive integer which is greater than 1 and not greater than the number of extension registers in the second set of extension registers, and wherein an input of one extension register of a first set of extension registers of a current operation stage is coupled to an output of one of a second set of extension registers of each of the adjacent previous N operation stages of the current operation stage through an N-to-1 multiplexer.

13. A method for performing an algorithm, wherein the algorithm is performed with a circuit comprising:
an input module for receiving data; and
an operation module for calculating a hash value based on the received data, the operation module including a plurality of operation stages arranged in a pipeline structure, the plurality of operation stages including a 0th operation stage, a 1st operation stage, up to a P-th operation stage, wherein P is a fixed positive integer greater than 1 and less than the number of operation stages in the pipeline structure,
wherein each of the 1st operation stage to the P-th operation stage includes:
a plurality of cache registers for storing intermediate values of a current operation stage and operating at a first frequency, and
a plurality of extension registers for storing extension data of a current operation stage, and including a first set of extension registers operating at the first frequency and a second set of extension registers operating at a second frequency,
wherein the second frequency is 1/N times of the first frequency, and N is a fixed positive integer which is greater than 1 and not greater than the number of extension registers in the second set of extension registers, and
wherein an input of one extension register of a first set of extension registers of a current operation stage is coupled to an output of one of a second set of extension registers of each of the adjacent previous N operation stages of the current operation stage through an N-to-1 multiplexer.

* * * * *